US012615204B2

(12) United States Patent
Kita

(10) Patent No.: US 12,615,204 B2
(45) Date of Patent: Apr. 28, 2026

(54) SWITCHING CONTROL OF COMMUNICATION ROUTE

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 270 days.

(21) Appl. No.: 18/574,072

(22) PCT Filed: Jan. 31, 2023

(86) PCT No.: PCT/JP2023/003040
§ 371 (c)(1),
(2) Date: Dec. 26, 2023

(87) PCT Pub. No.: WO2024/161499
PCT Pub. Date: Aug. 8, 2024

(65) Prior Publication Data
US 2025/0106144 A1 Mar. 27, 2025

(51) Int. Cl.
*H04L 45/00* (2022.01)
*H04L 45/12* (2022.01)

(52) U.S. Cl.
CPC ............ *H04L 45/22* (2013.01); *H04L 45/123* (2013.01)

(58) Field of Classification Search
None
See application file for complete search history.

(56) References Cited

U.S. PATENT DOCUMENTS

2014/0064063 A1* 3/2014 Holness .............. H04L 41/0659
370/225
2020/0013107 A1 1/2020 Kusano
2020/0274735 A1* 8/2020 Sekhri ................. H04L 41/0604
2021/0258243 A1 8/2021 Narasimhan et al.
2024/0171888 A1* 5/2024 Beard ................ H04Q 11/0005

FOREIGN PATENT DOCUMENTS

EP 2244398 A2 10/2010
WO 2018181826 A1 10/2018

* cited by examiner

*Primary Examiner* — Robert M Morlan
(74) *Attorney, Agent, or Firm* — HAUPTMAN HAM, LLP

(57) ABSTRACT

It is enabled that countermeasures are accurately taken against occurrence of a silent failure in communication between elements through a ring network. A monitor (72) monitors, for each of a plurality of routers that form the ring network, communication quality of a communication network under control of the router. A policy manager (90) determines, for each of the plurality of routers, whether the communication quality of the communication network under the control of the router has deteriorated. A slice manager (92) switches, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

8 Claims, 11 Drawing Sheets

FIG.6

| SERVER ID |
| --- |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

SWITCHING CONTROL OF COMMUNICATION ROUTE

RELATED APPLICATIONS

The present application is a National Phase of International Application Number PCT/JP2023/003040, filed Jan. 31, 2023.

TECHNICAL FIELD

The present invention relates to switching control of a communication route.

BACKGROUND ART

As an example of a technology relating to construction of a functional unit group and other elements in accordance with purchase of a network service, in Patent Literature 1, there is described a technology for deconstructing an order of a product purchased by a customer into virtualized network function (VNF) units and deploying the VNF units on a network functions virtualization infrastructure (NFVI). In addition, in Patent Literature 1, there are described failure monitoring of the NEVI and monitoring of traffic in a network for a customer.

CITATION LIST

Patent Literature

[Patent Literature 1] WO 2018/181826 A1

SUMMARY OF INVENTION

Technical Problem

There may occur deterioration of communication performance (so-called silent failure) in communication between elements such as functional units through a ring network without an abnormality such as a failure being detected in monitoring of communication between routers that form the ring network.

The present invention has been made in view of the above-mentioned circumstances, and has an object to enable countermeasures to be accurately taken against occurrence of a silent failure in communication between elements through a ring network.

Solution to Problem

In order to solve the above-mentioned issue, according to one embodiment of the present disclosure, there is provided a communication route control system including: monitoring means that monitors, for each of a plurality of routers that form a ring network, communication quality of a communication network under control of the each of the plurality of routers; determination means that determines, for each of the plurality of routers, whether the communication quality of the communication network under the control of the each of the plurality of routers has deteriorated; and switching means that switches, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

In addition, according to one embodiment of the present disclosure, there is provided a communication route control method including: monitoring, for each of a plurality of routers communication quality of a that form a ring network, communication network under control of the each of the plurality of routers; determining, for each of the plurality of routers, whether the communication quality of the communication network under the control of the each of the plurality of routers has deteriorated; and switching, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

BRIEF DESCRIPTION OF DRAWINGS

FIG. 6 is a diagram for illustrating an example of data structure of physical inventory data.

DESCRIPTION OF EMBODIMENTS

One embodiment of the present invention is now described in detail with reference to the drawings.

Figure 1:
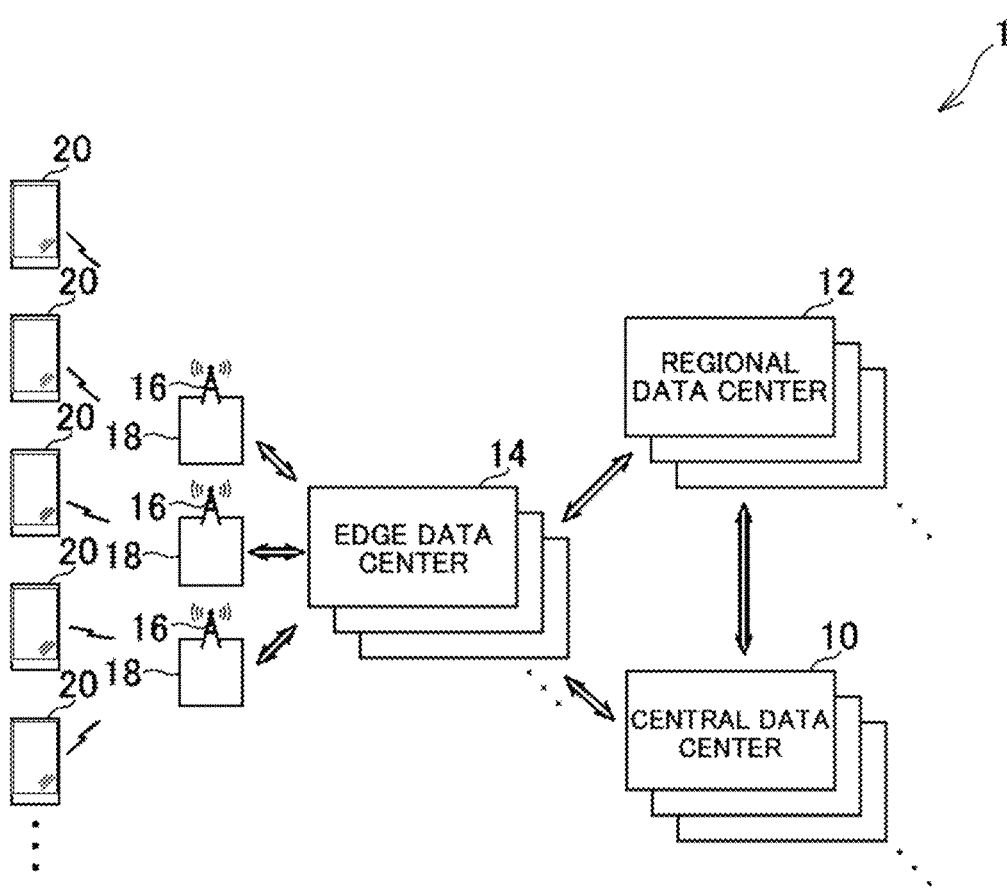
FIG. 1 is a diagram for illustrating an example of a communication system in one embodiment of the present invention.
Figure 2:
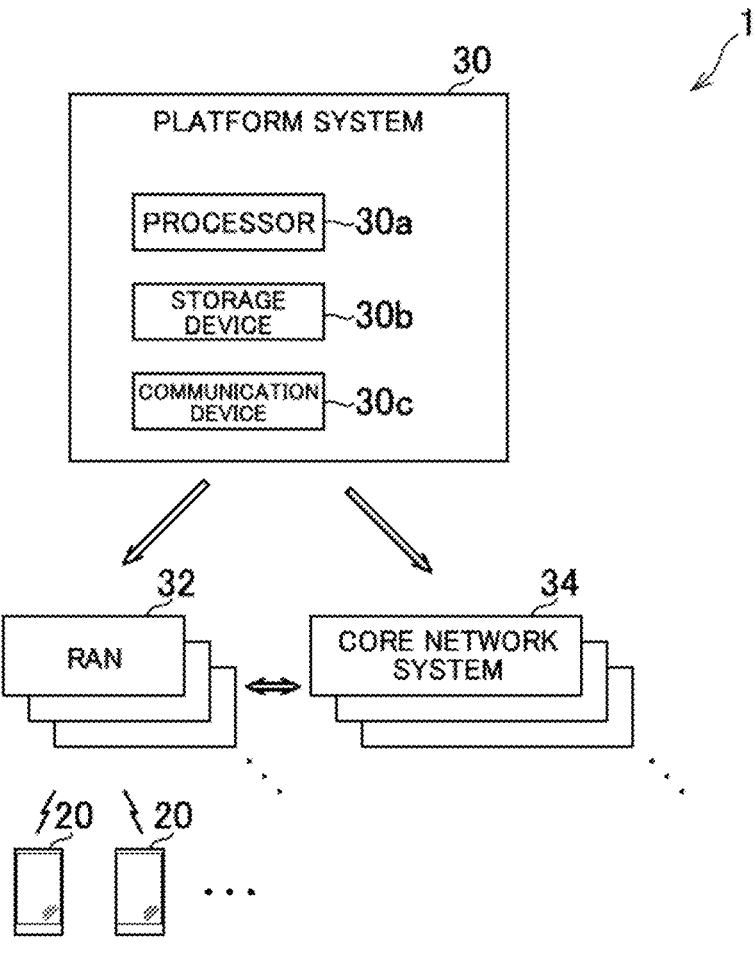
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. Here, as illustrated in FIG. 1, one edge data center 14 may be capable of communicating to and from several communication facilities 18. The communication facility 18 may include a computer such as a server computer. The communication facility 18 in the present embodiment performs radio communication to and from a user equipment (UE) 20 via the antenna 16. For example, a radio unit (RU) described later is arranged in the communication facility 18 provided with the antenna 16.

A plurality of servers are arranged in each of the central data centers 10, the regional data centers 12, and the edge data centers 14 in the present embodiment.

In the present embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in the present embodiment includes a platform system 30, a plurality of radio access networks (RANs) 32, a plurality of core network systems 34, and a plurality of UEs 20. The core network systems 34, the RANs 32, and the UEs 20 cooperate with each other to implement a mobile communication network.

The RANs 32 are each a computer system which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANS 32 in the present embodiment are implemented mainly by server groups arranged in the edge data centers 14 and the communication facilities 18. A part of the RANs 32 (for example, distributed unit (DU), central unit (CU), virtual distributed unit (vDU), or virtual central unit (vCU)) may be implemented by the central data center 10, the regional data center 12, or the communication facility 18 instead of the edge data center 14.

The core network systems 34 are each a system corresponding to an evolved packet core (EPC) in 4G or a 5G core (5GC) in 5G. The core network systems 34 in the present embodiment are implemented mainly by server groups arranged in the central data centers 10 or the regional data centers 12.

The platform system 30 in the present embodiment is configured, for example, on a cloud platform and includes a processor 30a, a storage device 30b, and a communication device 30c, as illustrated in FIG. 2. The processor 30a is a program control device such as a microprocessor which operates in accordance with a program installed in the platform system 30. The storage device 30b is, for example, a storage element such as a ROM or RAM, a solid state drive (SSD), a hard disk drive (HDD), or the like. The storage device 30b stores a program to be executed by the processor 30a, and the like. The communication device 30c is, for example, a communication interface, such as a network interface controller (NIC) or a wireless local area network (LAN) module. Software-defined networking (SDN) may be implemented in the communication device 30c. The communication device 30c exchanges data with the RAN 32 and the core network system 34.

In the present embodiment, the platform system 30 is implemented by a server group arranged in the central data center 10. The platform system 30 may be implemented by a server group arranged in the regional data center 12.

In the present embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like, is provided to the purchaser who is a mobile virtual network operator (MVNO). The voice communication service or the data communication service provided in the present embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in the present embodiment, an Internet of things (IoT) service may be provided to an end user who uses a robot arm, a connected car, or the like. In such a case, an end user who uses, for example, a robot arm, a connected car, or the like may be a purchaser of the network service in the present embodiment.

In the present embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in the present embodiment is formed of one or a plurality of functional units (for example, network function (NF)). In the present embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in the present description. The present embodiment is described on the assumption that the network service is implemented by one or a plurality of CNFs. The functional unit in the present embodiment may also correspond to a network node.

Figure 3:
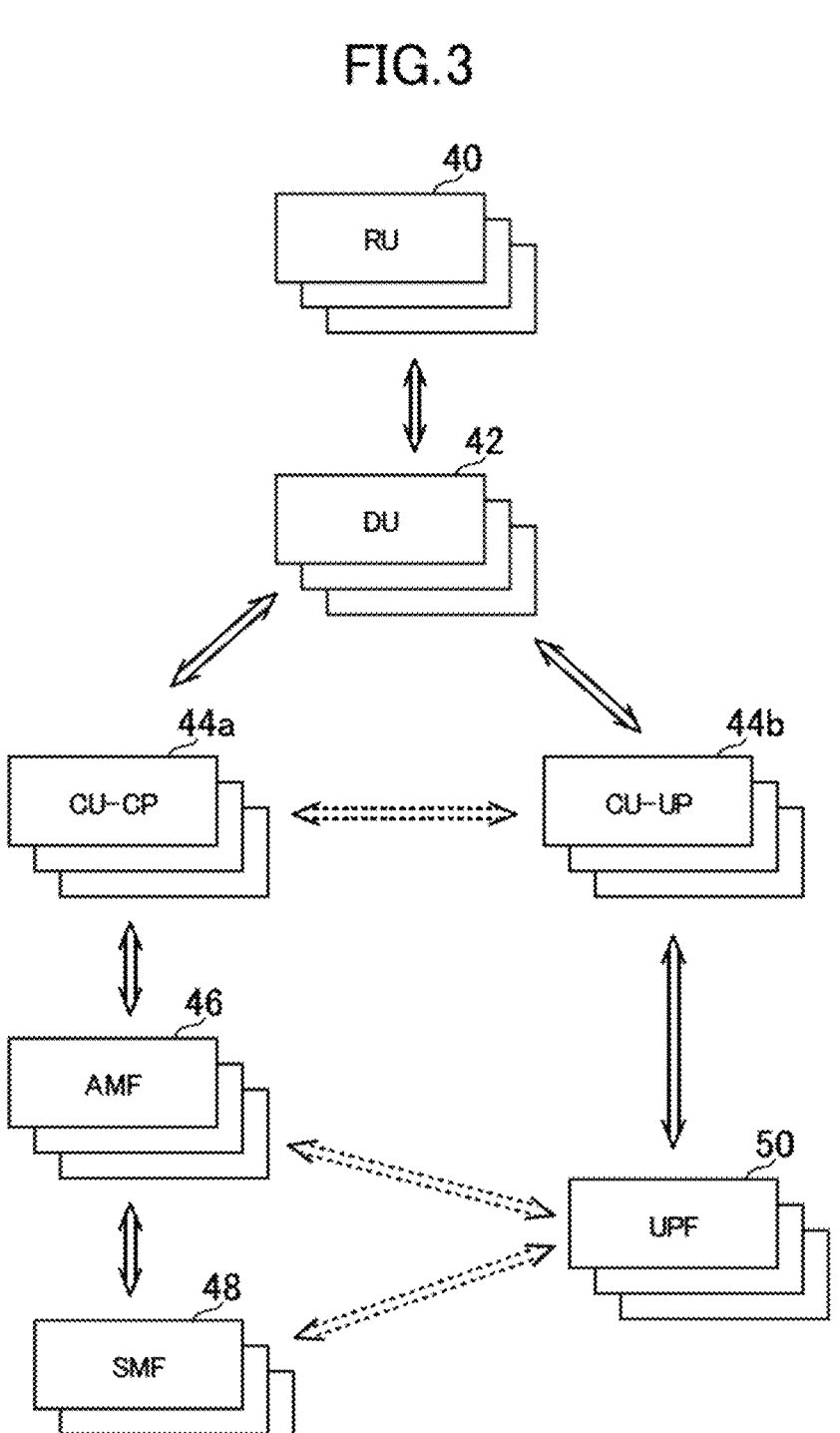
FIG. 3 is a diagram for schematically illustrating an example of a network service in the one embodiment of the present invention.

FIG. 3 is a diagram for schematically illustrating an example of an operating network service. The network service illustrated in FIG. 3 includes NFs, such as a plurality of RUs 40, a plurality of DUs 42, a plurality of CUs 44 (central unit-control planes (CU-CPs) 44$a$ and central unit-user planes (CU-UPs) 44$b$), a plurality of access and mobility management functions (AMFs) 46, a plurality of session management functions (SMFs) 48, and a plurality of user plane functions (UPFs) 50, as software elements.

In the example of FIG. 3, the RU 40, the DU 42, the CU-CP 44$a$, the AMF 46, and the SMF 48 correspond to elements of a control plane (C-Plane), and the RU 40, the DU 42, the CO-UP 44$b$, and the UPF 50 correspond to elements of a user plane (U-Plane).

The network service may include other types of NFs as software elements. In addition, the network service is implemented on a plurality of servers or other computer resources (hardware elements).

Then, in the present embodiment, for example, the network service illustrated in FIG. 3 provides a communication service in a certain area.

Then, in the present embodiment, it is assumed that the plurality of RUs 40, the plurality of DUs 42, the plurality of CU-UP 44$b$, and the plurality of UPFs 50, which are illustrated in FIG. 3, belong to one end-to-end network slice.

Figure 4:
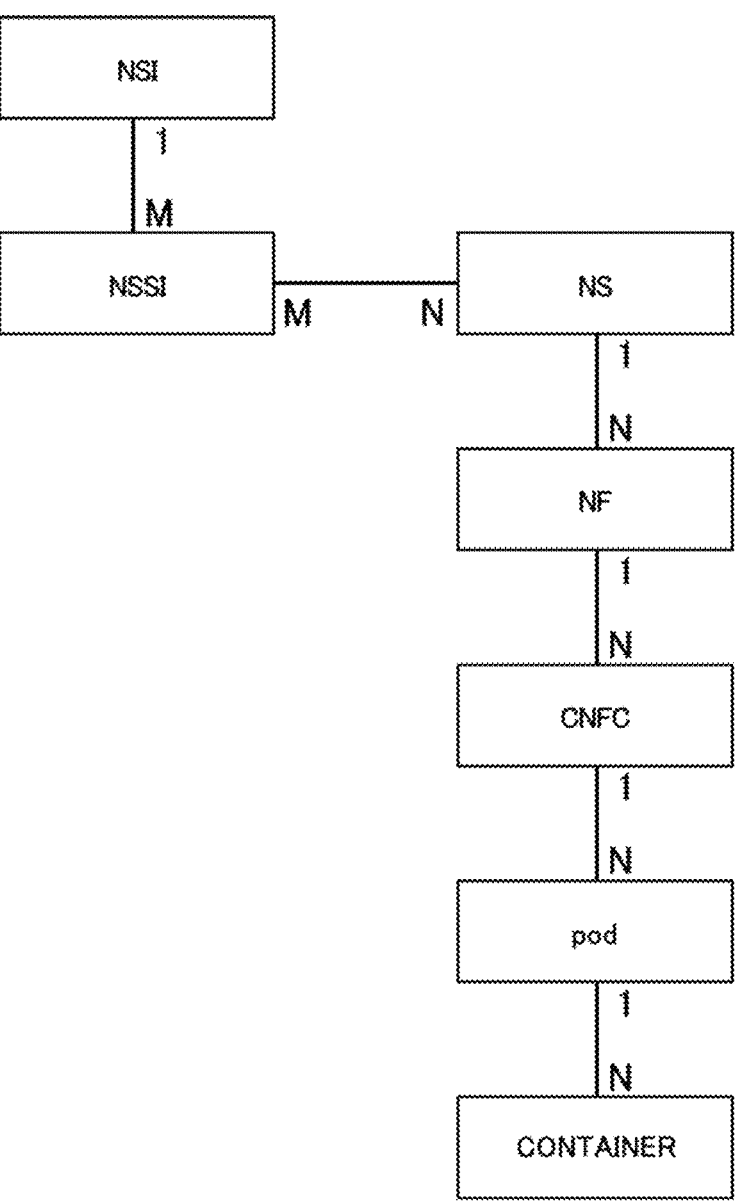
FIG. 4 is a diagram for illustrating an example of links between elements constructed in the communication system in the one embodiment of the present invention.

FIG. 4 is a diagram for schematically illustrating an example of links between elements constructed in the communication system 1 in the present embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. Here, the NS may correspond to an element having a granularity, for example, a 5GC, an EPC, a 5G RAN (gNB), or a 4G RAN (eNB).

In 5G, the NF corresponds to an element having a granularity, for example, the RU, the DU, the CU-CP, the CU-UP, the AMF, the SMF, or the UPF. In 4G, the NF corresponds to an element having a granularity, for example, a mobility management entity (MME), a home subscriber server (HSS), a serving gateway (S-GW), a vDU, or a vCU. In the present embodiment, for example, one NS includes one or a plurality of NFs. That is, one or a plurality of NFs are under the control of one NS.

The CNFC corresponds to an element having a granularity, for example, DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In the present embodiment, for example, one NE includes one or a plurality of CNFCs. That is, one or a plurality of CNFCs are under the control of one NF.

The pod refers to, for example, the minimum unit for managing a Docker container by Kubernetes. In the present embodiment, for example, one CNFC includes one or a plurality of pods. That is, one or a plurality of pods are under the control of one CNFC.

In the present embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile backhaul (MBH) domain, or a slice of a core network domain.

In the present embodiment, for example, one NSI includes one or a plurality of NSSIS. That is, one or a plurality of NSSIs are under the control of one NSI. In the present embodiment, a plurality of NSIs may share the same NSSI.

In addition, as illustrated in FIG. 4, the NSSI and the NS generally have a many-to-many relationship.

In addition, in the present embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. Here, the S-NSSAI is information associated with the network slice. The NF is not required to belong to the network slice.

Figure 5:
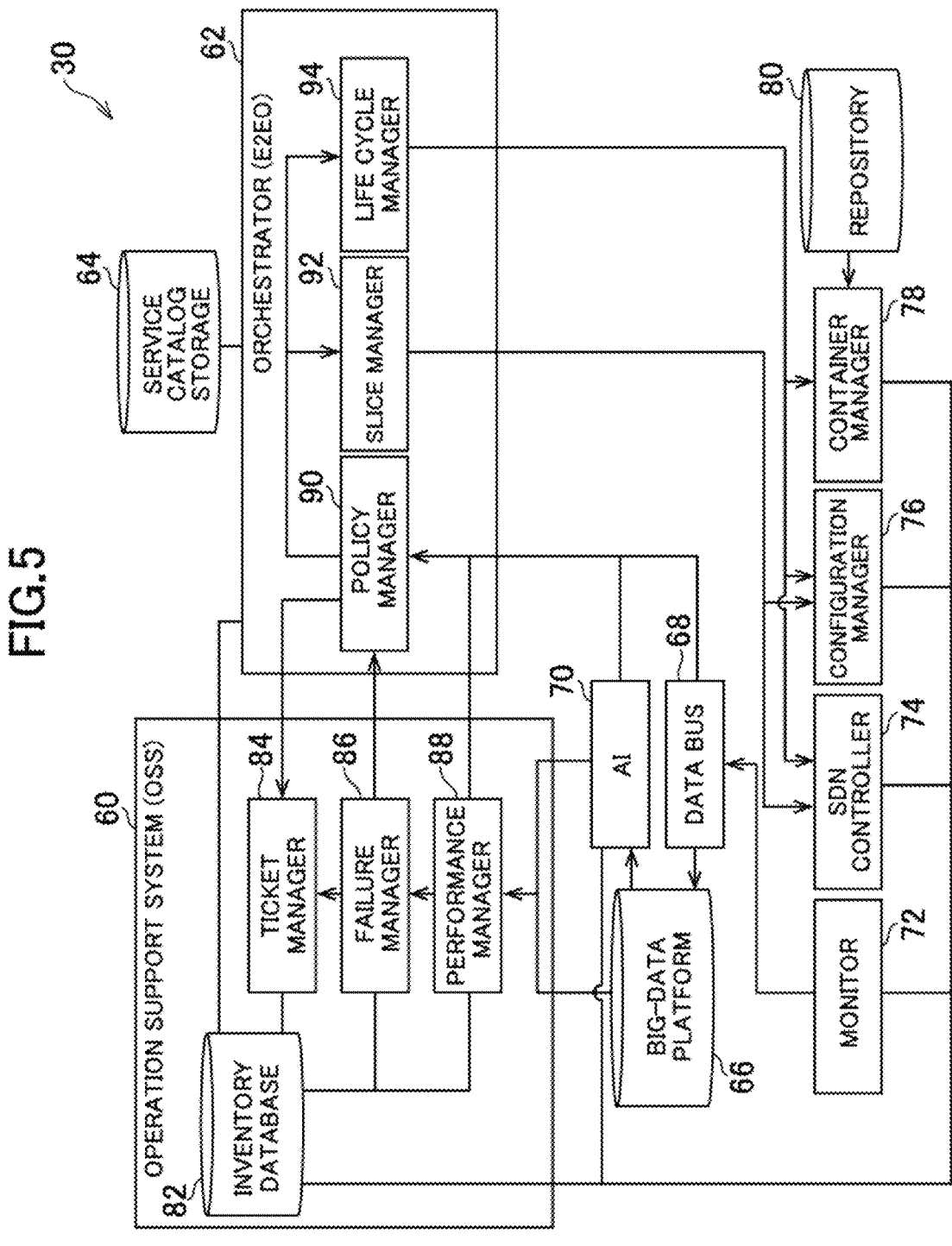
FIG. 5 is a functional block diagram for illustrating an example of functions implemented by a platform system in the one embodiment of the present invention.

FIG. 5 is a functional block diagram for illustrating an example of functions implemented by the platform system 30 in the present embodiment. The platform system 30 in the present embodiment is not required to implement all the functions illustrated in FIG. 5, and may implement functions other than the functions illustrated in FIG. 5.

As illustrated in FIG. 5, the platform system 30 in the present embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30$a$, the storage device 30$b$, and the communication device 30$c$.

The functions illustrated in FIG. 5 may be implemented by executing, by the processor 30$a$, a program that is installed in the platform system 30, which is one or a plurality of computers, and that includes instructions corresponding to the functions. The program may be supplied to the platform system 30 via a computer-readable information storage medium such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

Here, the platform system 30 in the present embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In the present embodiment, the repository 80 stores, for example, a container image of a container included in a functional unit group (for example, NF group) that achieves a network service.

The inventory database 82 is a database in which inventory information is stored. The inventory information includes, for example, information on a server arranged in the RAN 32 or the core network system 34 and managed by the platform system 30.

In addition, in the present embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to the CNFC. The CNFC data indicates, for example, attributes such as an identifier of an instance and the type of the CNFC. The logical inventory data may also include pod data indicating information relating to the pod included in the CNFC. The pod data indicates, for example, attributes such as an identifier of an instance of the pod and the type of the pod. The logical inventory data may also include container data indicating information relating to the container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NS-SAI, which is set for each NF.

In addition, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. The service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the service template data. The CNFD may indicate computer resources (for example, CPU, memory, and hard disk drive) required by the CNF. For example, the CNFD may also indicate, for each of a plurality of containers included in the CNF, computer resources (CPU, memory, hard disk drive, and the like) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In the present embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute the workflow script, to thereby instruct the container manager 78 to deploy the container included in the new network service to be purchased. Then, the container manager 78 may acquire the container image of the container from the repository 80 and deploy a container corresponding to the container image in the server.

In addition, in the present embodiment, the life cycle manager 94 executes, for example, scaling or replacement of the element included in the communication system 1. Here, the life cycle manager 94 may output a container deployment instruction or deletion instruction to the container manager 78. Then, the container manager 78 may execute, for example, a process of deploying a container or a process of deleting a container in accordance with the instruction. In the present embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output, to the SDN controller 74, an instruction to create a communication route between two IP addresses linked to the two IP addresses.

In the present embodiment, the slice manager 92 executes, for example, instantiation of a network slice. In the present embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the Third Generation Partnership Project (3GPP) (trademark) specification "TS28 533." The NSMF is a function of generating and managing network slices, and provides an NSI management service. The NSSMF is a function of generating and managing network slice subnets forming a part of a network slice, and provides an NSSI management service.

The slice manager 92 may output a configuration management instruction related to the instantiation of the network slice to the configuration manager 76. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In the present embodiment, for example, the configuration manager 76 executes configuration management such as settings of the element group including the NFs in accordance with the configuration management instruction received from the life cycle manager 94 or the slice manager 92.

In the present embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

Here, for example, the SDN controller 74 may use a segment routing technology (for example, segment routing IPV6 (SRv6)) to construct an NSI and NSSI for the server or an aggregation router present between communication routes. In addition, the SDN controller 74 may generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 74 may, for example, change the maximum value of the bandwidth that can be used for communication between two IP addresses without constructing a network slice.

The platform system 30 in the present embodiment may include a plurality of SDN controllers 74. Each of the plurality of SDN controllers 74 may execute a process such as the creation of a communication route for a network device group including the aggregation routers associated with the SDN controller 74.

In the present embodiment, the monitor 72 monitors, for example, the element group included in the communication system 1 based on a given management policy. Here, for example, the monitor 72 may monitor the element group based on a monitoring policy designated by the purchaser when the purchaser purchases the network service.

In the present embodiment, the monitor 72 executes monitoring at various levels, for example, a slice level, an NS level, an NF level, a CNFC level, and a level of hardware such as the server.

For example, the monitor 72 may set a module that outputs metric data in the hardware such as the server or a software element included in the communication system 1 so that monitoring can be performed at the various levels described above. Here, for example, the NF may output the metric data indicating a metric that can be measured (that can be identified) by the NF to the monitor 72. Further, the server may output the metric data indicating a metric relating to the hardware that can be measured (that can be identified) by the server to the monitor 72.

In addition, for example, the monitor 72 may deploy, in the server, a sidecar container that aggregates the metric data indicating the metrics output from a plurality of containers in units of CNFCs (microservices). The sidecar container may include an agent called "exporter." The monitor 72 may repeatedly execute a process of acquiring the metric data aggregated in units of microservices from the sidecar container, at predetermined monitoring intervals through use of the mechanism of a monitoring tool such as Prometheus that can monitor a container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

Then, in the present embodiment, the monitor 72 executes, for example, a process (enrichment) of aggregating the metric data in predetermined aggregation units, to thereby generate performance index value data indicating the performance index values of the elements included in the communication system 1 in the aggregation units.

For example, for one gNB, the metric data indicating the metrics of the elements (for example, network nodes such as the DUs 42 and the CUs 44) under the control of the qNB are aggregated, to thereby generate the performance index value data on the gNB. In such a manner, the performance index value data indicating communication performance in an area covered by the qNB is generated. Here, for example, the performance index value data indicating a plurality of types of communication performance, such as a traffic amount (throughput) and latency, may be generated for each qNB. In addition, the metric data indicating the metrics of a certain element (for example, DU 42) during a predetermined period may be aggregated, to thereby generate the performance index value data indicating the communication performance of the element during the predetermined period. The communication performance indicated by the performance index value data is not limited to the traffic amount and the latency.

Then, the monitor 72 outputs, to the data bus 68, the performance index value data generated by the above-mentioned enrichment.

In the present embodiment, the data bus 68 receives, for example, the performance index value data output from the monitor 72. Then, the data bus 68 generates, based on one or a plurality of pieces of performance index value data that have been received, a performance index value file including the one or the plurality of pieces of performance index value data. Then, the data bus 68 outputs the generated performance index value file to the big-data platform 66.

Further, the elements, such as the network slice, the NS, the NF, the CNFC, that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file obtained by combining one or a plurality of pieces of alert message data each indicating the notification into one file, and outputs the alert file to the big-data platform 66.

In the present embodiment, the big-data platform 66 accumulates, for example, the performance index value files and the alert files that have been output from the data bus 68.

In the present embodiment, for example, the AI 70 stores in advance a plurality of trained machine learning models. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning models. The estimation process is suitable when long-term trend prediction is performed infrequently.

The AI 70 can also acquire the performance index value data stored in the data bus 68. The AI 70 may execute estimation process based on the performance index value data stored in the data bus 68 and the above-mentioned machine learning models. The estimation process is suitable when short-term prediction is performed frequently.

In the present embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. The performance manager 88 may also acquire the estimation result data from the AI 70. Then, the performance index value such as the KPI may be calculated based on at least one of the performance index value file or the estimation result data. The performance manager 88 may acquire the metric data directly from the monitor 72. Then, the performance index value such as the KPI may be calculated based on the metric data.

In the present embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may acquire the metric data and the notification of the alert directly from the monitor 72. The failure manager 86 may also acquire the performance index value file and the alert file from the big-data platform 66. The failure manager 86 may also acquire the alert message data from the data bus 68.

In the present embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. In addition, for example, the policy manager 90 may output, to the slice manager 92, an instruction to switch the communication route. The policy manager 90 may also output an instruction for scaling or replacement of the elements to the life cycle manager 94 based on the result of the determination process.

The policy manager 90 in the present embodiment can acquire the performance index value data stored in the data bus 68. Then, the policy manager 90 may execute the predetermined determination process based on the performance index value data acquired from the data bus 68. The policy manager 90 may also execute the predetermined determination process based on the alert message data stored in the data bus 68.

In the present embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may transmit, for example, an email to which the generated ticket is attached to an email address of the administrator of the communication system 1.

In the communication system 1 in the present embodiment, there may occur deterioration of the communication performance (so-called silent failure) in communication between elements such as functional units without an abnormality such as a failure being detected.

Now, an example of countermeasures to be taken against occurrence of a silent failure executed in the platform system 30 in the present embodiment is described.

Figure 7:
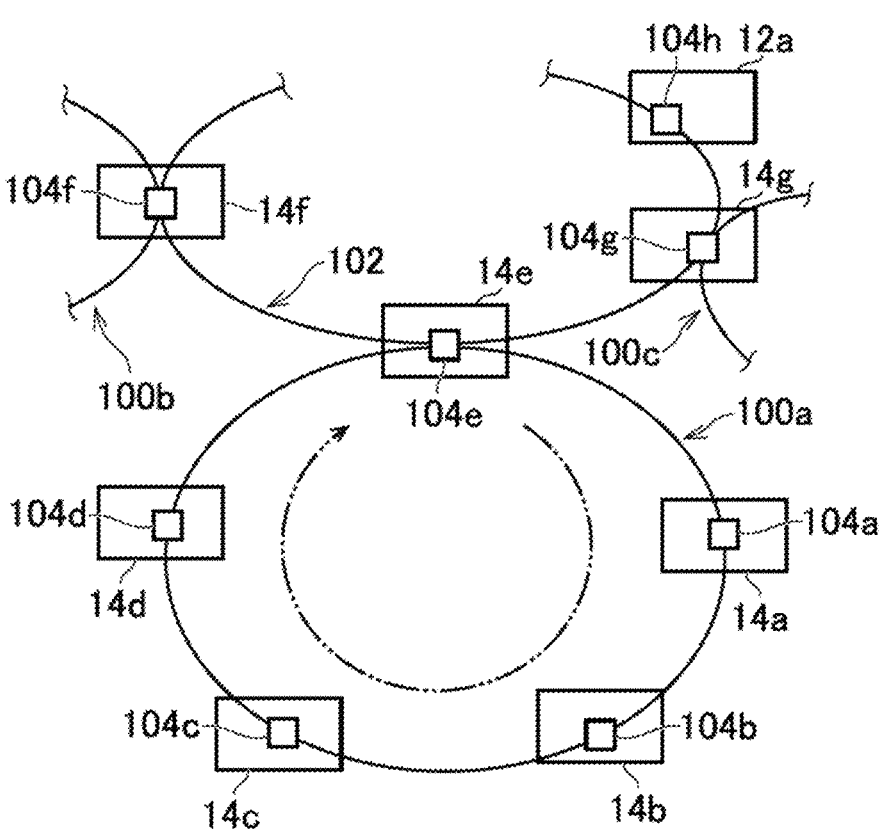
FIG. 7 is a diagram for schematically illustrating an example of a configuration of a ring network.

FIG. 7 is a diagram for schematically illustrating an example of a configuration of a ring network that is a part of the communication system 1 in the present embodiment.

FIG. 7 is an illustration of lower rings 100 (100a, 100b, and 100c) and an intermediate ring 102, which form an example of the ring network included in the communication system 1.

The lower ring 100a illustrated in FIG. 7 is formed of, for example, a plurality of routers 104 (in the example of FIG. 7, router 104a to router 104e). Those routers 104 are each arranged in the edge data center 14. For example, the router 104a to the router 104e are arranged in an edge data center 14a to an edge data center 14e, respectively.

In addition, the lower ring 100b is formed of, for example, a plurality of routers 104 including a router 104f arranged in an edge data center 14f. In addition, the lower ring 100c is formed of, for example, a plurality of routers 104 including a router 104g arranged in an edge data center 14g.

The intermediate ring 102 is an upper-level ring network immediately above the lower ring 100. As illustrated in FIG. 7, the intermediate ring 102 is formed of, for example, a plurality of routers 104 including: the router 104e that is a node between the intermediate ring 102 and the lower ring

100*a*; the router 104*f* that is a node between the intermediate ring 102 and the lower ring 100*b*; the router 104*g* that is a node between the intermediate ring 102 and the lower ring 100*c*; and a router 104*h* arranged in the regional data center 12 (in the example of FIG. 7, regional data center 12*a*). The routers 104 that form the intermediate ring 102 are not required to include the router 104 arranged in the regional data center 12.

In addition, in the present embodiment, it is assumed that, for example, the CUs 44 are implemented by a server group arranged in the regional data center 12*a*.

In the present embodiment, the server groups arranged in the regional data center 12*a* and the edge data centers 14 that are illustrated in FIG. 7 can communicate to and from the server group arranged in the central data center 10 through the intermediate ring 102 and an upper-level ring network above the intermediate ring 102.

In the present embodiment, for example, the monitor 72 monitors, for each of the plurality of routers 104 that form the ring network, communication quality of a communication network under the control of the router 104.

For example, in regard to the lower ring 100*a*, the monitor 72 monitors the communication quality of the communication network under the control of the router 104 for each of the router 104*a* to the router 104*e*.

Figure 8:
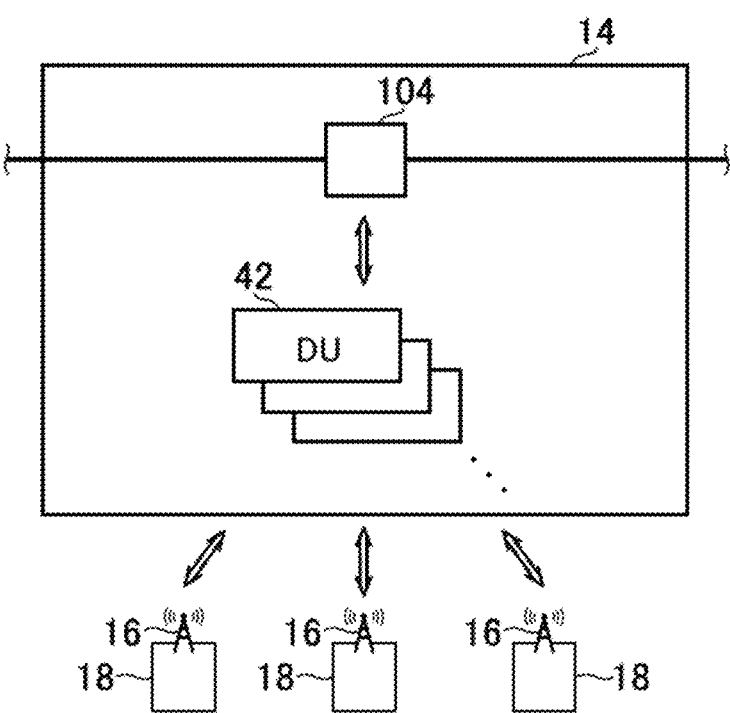
FIG. 8 is a diagram for illustrating an example of arrangement of DUs.

Here, for example, as illustrated in FIG. 8, the DUs 42 may be implemented by the server group arranged in the edge data center 14. In such a case, the monitor 72 may acquire, from the DUs 42 implemented by the server group arranged in the edge data center 14, the metric data indicating the metrics measured by the implemented DUs 42.

Then, the monitor 72 may calculate, based on the metric data acquired from the DUs 42 implemented by the server group arranged in the edge data center 14, the performance index values indicating the communication performance of the elements included in the communication network under the control of the router 104 arranged in the edge data center 14. Then, the monitor 72 may generate performance index value data indicating the calculated performance index values. The elements included in the communication network under the control of the router 104 may include the router 104 or may exclude the router 104.

Figure 9:
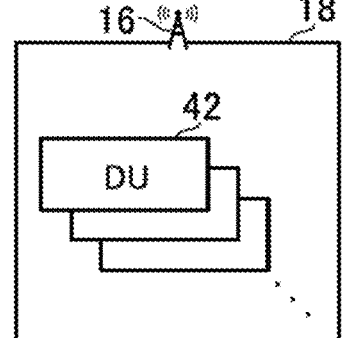
FIG. 9 is a diagram for illustrating an example of the arrangement of the DUs.
Figure 9:
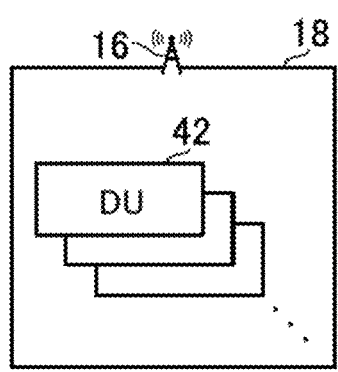
Figure 9:
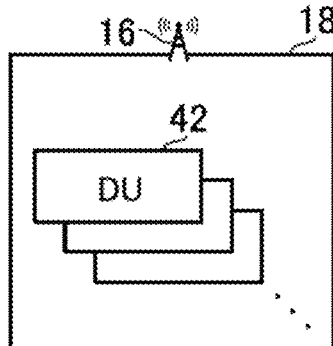

As another example, as illustrated in FIG. 9, the DUs 42 may be implemented by the communication facility 18 enabled to communicate to and from the edge data center 14 illustrated in FIG. 7. In such a case, the monitor 72 may acquire, from the DUs 42 implemented by the communication facility 18 enabled to communicate to and from the edge data center 14, the metric data indicating the metrics measured by the implemented DUs 42.

Then, the monitor 72 may calculate, based on the metric data acquired from the DUs 42 implemented by the communication facility 18, the performance index values indicating the communication performance of the elements included in the communication network under the control of the router 104 arranged in the edge data center 14. Then, the monitor 72 may generate performance index value data indicating the calculated performance index values.

When the DUs 42 are implemented by both the server group arranged in the edge data center 14 and the communication facility 18 enabled to communicate to and from the edge data center 14, the performance index values indicating the communication performance of the elements included in the communication network under the control of the router 104 arranged in the edge data center 14 may be calculated based on the metric data acquired from the DUs 42 implemented by the server group arranged in the edge data center 14 and the DUs 42 implemented by the communication facility 18.

In addition, for each of the plurality of routers 104 that form the ring network, the monitor 72 may calculate, at predetermined time period intervals, based on the metric data measured by the DUs 42 under the control of the router 104 during the most recent predetermined time period, the performance index values indicating the communication performance of the elements included in the communication network under the control of the router 104 during the predetermined time period. Then, in response to a fact that the performance index values have been calculated, the monitor 72 may generate the performance index value data indicating the calculated performance index values.

The monitor 72 may monitor, as the communication quality of the communication network under the control of the router 104, the communication quality of the communication between at least one element (for example, NF) included in the communication network under the control of the router 104 and at least one element (for example, NF) under the control of the router 104 that forms an upper-level ring network above the ring network. For example, the monitor 72 may monitor, as the communication quality of the communication network under the control of the router 104, the communication quality of the communication between at least one element (for example, DU 42) that forms the communication network under the control of the router 104 and the CU 44 under the control of the router that forms an upper-level ring network above the ring network.

The monitor 72 may also monitor, as the communication quality of the communication network under the control of the router 104, the communication quality of the user equipment (UE) 20 within an area covered by at least one element under the control of the router 104.

Examples of the performance index value indicating the communication performance of each element included in the communication network under the control of the router 104 include an RRC connection completion rate, an abnormal disconnection count of RRC connection, a registration completion rate, and a bearer connection completion rate. In addition, a comprehensive index value (for example, weighted average value of a plurality of types of values) calculated in accordance with a predetermined calculation expression based on a plurality of types of values may be calculated as the performance index value indicating the communication performance of each element included in the communication network under the control of the router 104 arranged in the edge data center 14.

The monitor 72 may also calculate the performance index value indicating the communication performance of each element included in the communication network under the control of the router 104 based on at least one of a type of at least one element included in the communication network under the control of the router 104 or a topology of the at least one element.

For example, for each of the routers 104, a calculation expression associated with the router 104 may be determined based on at least one of the type of at least one element included in the communication network under the control of the router 104 or the topology of the at least one element. Then, the calculation expression associated with the router 104 may be applied to the value of the metric data, to thereby calculate the performance index value indicating the communication performance of each element included in the communication network under the control of the router 104.

For example, it is assumed that no NF is implemented in the edge data center 14e and there is no communication facility 18 enabled to communicate to and from the edge data center 14e. In such a case, the performance index value indicating the communication performance of each element included in the communication network under the control of the router 104e may be calculated based on a rate of success of relaying a packet passing through the router 104e. In such a case, the performance index value calculated in such a manner corresponds to the performance index value indicating the communication performance of each element included in the communication network under the control of the router 104e.

As another example, when the CU 44 is implemented in the edge data center 14, the communication quality of the communication between the CU 44 and an element (such as the AMF 46) that is arranged in the intermediate ring 102 or an upper-level ring network above the intermediate ring 102 and communicates to and from the CU 44 may be monitored as the communication quality of the communication network under the control of the router 104 arranged in the edge data center 14. In such a case, for example, a value indicating the number of occurrences of SCTP flapping may be monitored as the performance index value indicating the communication performance of each element included in the communication network under the control of the router 104.

Then, in the present embodiment, for example, the policy manager 90 determines, for each of the plurality of routers 104 that form the ring network, whether or not the communication quality of the communication network under the control of the router 104 has deteriorated. Here, the policy manager 90 may determine, based on the above-mentioned performance index values, whether or not the communication quality of the communication network under the control of the router 104 has deteriorated. A process of determining whether or not the communication quality of the communication network under the control of the router 104 has deteriorated is hereinafter referred to as "communication quality deterioration determination process."

Here, for example, as described above, the monitor 72 may output the performance index value data to the data bus 68. Then, for example, in response to a fact that the performance index value data has been output to the data bus 68, the policy manager 90 may acquire the performance index value data. Then, the policy manager 90 may execute the communication quality deterioration determination process based on the acquired performance index value data.

For example, when the performance index value that becomes larger as the communication quality becomes higher is being monitored, the policy manager 90 may determine whether or not the performance index value is equal to or smaller than a threshold value. In such a case, when the performance index value is equal to or smaller than the threshold value, it is determined that the communication quality of the communication network under the control of the router 104 has deteriorated. In contrast, when the performance index value that becomes larger as the communication quality becomes lower is being monitored, the policy manager 90 may determine whether or not the performance index value is equal to or larger than the threshold value. In such a case, when the performance index value is equal to or larger than the threshold value, it is determined that the communication quality of the communication network under the control of the router 104 has deteriorated.

In the present embodiment, for example, the slice manager 92 switches a communication route between the plurality of routers 104 to an alternative route when a predetermined condition is satisfied. Here, the slice manager 92 may cooperate with the SDN controller 74 to switch the communication route.

The above-mentioned predetermined condition is hereinafter referred to as "communication route switching condition." In addition, a process of switching the communication route when the communication route switching condition is satisfied is hereinafter referred to as "communication route switching process."

Here, examples of the communication route switching condition include a condition consisting of: (1) it is determined, in the communication quality deterioration determination process relating to a predetermined number of two or more routers 104 in succession from the most upstream router 104 in a communication route connecting the plurality of routers 104 that form the ring network, that the communication quality of the communication networks under the control of the routers 104 has deteriorated; and (2) it is determined, in the communication quality deterioration determination process relating to the remaining router 104 that form the ring network, that the communication quality of the communication network under the control of the router 104 has not deteriorated.

When the communication route switching condition is satisfied, the slice manager 92 may switch the communication route between the plurality of routers 104 that form the ring network to the alternative route. That is, when it is determined that the communication quality of the communication networks under the control of a predetermined number of two or more routers 104 in succession from the most upstream router 104 in the communication route connecting the plurality of routers 104 has deteriorated and it is determined that the communication quality of the communication network under the control of the remaining router 104 has not deteriorated, the slice manager 92 may switch the communication route between the plurality of routers 104 to the alternative route.

For example, it is assumed that a communication route through which data is transmitted clockwise and a communication route through which data is transmitted counterclockwise are set between the plurality of routers 104 that form the lower ring 100a and those two communication routes are physically separate communication routes.

Then, as illustrated in FIG. 7, it is assumed that the data is transmitted clockwise in the communication between the plurality of routers 104 that form the lower ring 100a. That is, it is assumed that the clockwise communication route is an active communication route and the counterclockwise communication route is the standby communication route.

In such a case, for example, data to be transmitted from the UE 20 within an area covered by the DU 42 under the control of the router 104a to the CU 44 implemented in the regional data center 12a passes through the DU 42 under the control of the router 104a, the router 104a, the router 104b, the router 104c, the router 104d, and the router 104e.

In addition, data to be transmitted from the UE 20 within an area covered by the DU 42 under the control of the router 104b to the CU 44 implemented in the regional data center 12a passes through the DU 42 under the control of the router 104b, the router 104b, the router 104c, the router 104d, and the router 104e.

In addition, data to be transmitted from the UE 20 within an area covered by the DU 42 under the control of the router 104c to the CU 44 implemented in the regional data center 12a passes through the DU 42 under the control of the router 104c, the router 104c, the router 104d, and the router 104e.

In addition, data to be transmitted from the UE 20 within an area covered by the DU 42 under the control of the router 104d to the CU 44 implemented in the regional data center 12a passes through the DU 42 under the control of the router 104d, the router 104d, and the router 104e.

In such a case, the router 104a is the most upstream router 104 in the communication route that is for uplink communication from the UE 20 to the CU 44 and that connects the plurality of routers 104 that form the lower ring 100a.

Here, it is assumed that the above-mentioned predetermined number is two. In such a case, the communication route switching condition is a condition consisting of: (1) it is determined, in the communication quality deterioration determination process relating to the predetermined number of two or more routers 104 in succession from the router 104a in the uplink communication, that the communication quality of the communication networks under the control of the routers 104 has deteriorated; and (2) it is determined, in the communication quality deterioration determination process relating to the remaining router 104, that the communication quality of the communication network under the control of the router 104 has not deteriorated.

Thus, when it is determined that the communication quality of the communication networks under the control of the router 104a and the router 104b has deteriorated and it is determined that the communication quality of the communication networks under the control of the router 104c, the router 104d, and the router 104e has not deteriorated, the communication route between the plurality of routers 104 that form the lower ring 100a is switched to the alternative route.

In addition, also when it is determined that the communication quality of the communication networks under the control of the router 104a, the router 104b, and the router 104c has deteriorated and it is determined that the communication quality of the communication networks under the control of the router 104d and the router 104e has not deteriorated, the communication route between the plurality of routers 104 that form the lower ring 100a is switched to the alternative route.

In addition, also when it is determined that the communication quality of the communication networks under the control of the router 104a, the router 104b, the router 104c, and the router 104d has deteriorated and it is determined that the communication quality of the communication network under the control of the router 104e has not deteriorated, the communication route between the plurality of routers 104 that form the lower ring 100a is switched to the alternative route.

In such a case, it may be determined, in the communication quality deterioration determination process, whether or not the communication quality in the uplink communication has deteriorated. Then, the communication route switching condition may be a condition consisting of: (1) it is determined, in the communication quality deterioration determination process relating to the predetermined number of two or more routers 104 in succession from the router 104a, that the communication quality in the uplink communication of the communication networks under the control of the routers 104 has deteriorated; and (2) it is determined, in the communication quality deterioration determination process relating to the remaining router 104 that form the ring network, that the communication quality in the uplink communication of the communication network under the control of the router 104 has not deteriorated.

Further, when the communication route switching condition is satisfied, the slice manager 92 may execute the communication route switching process of switching the communication route that is either clockwise or counterclockwise and that is between the plurality of routers 104 forming the ring network to a communication route in a reverse direction.

Figure 10:
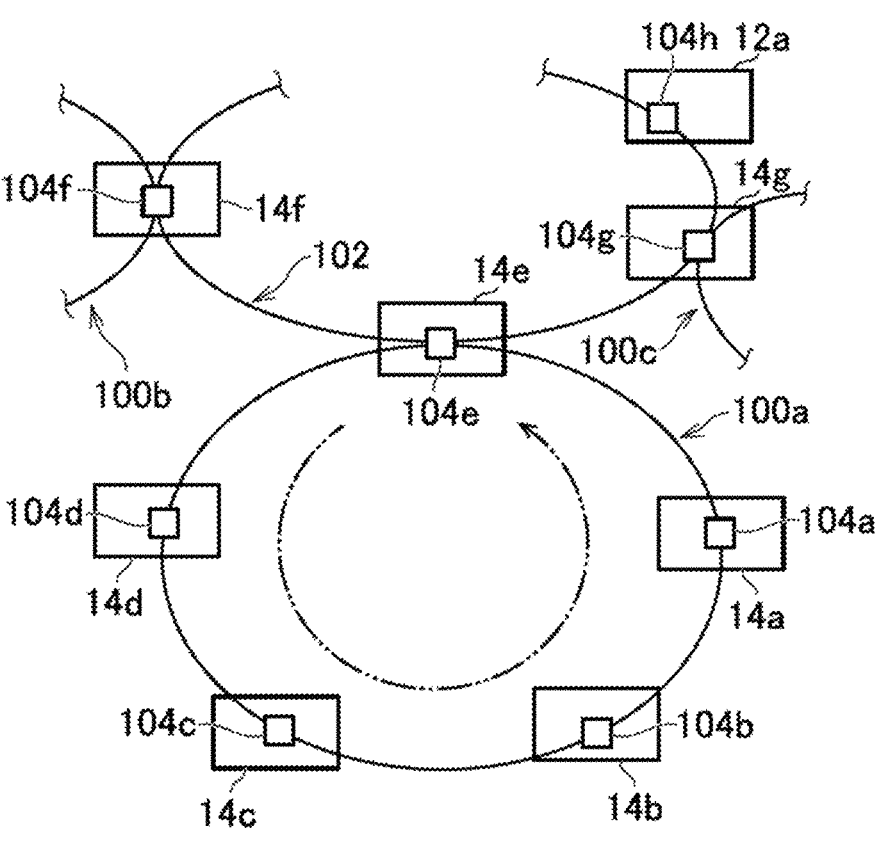
FIG. 10 is a diagram for schematically illustrating an example of the configuration of the ring network.

For example, it is assumed that, as described above, the clockwise communication route is the active communication route and the counterclockwise communication route is the standby communication route. Here, when the communication route switching condition is satisfied, as illustrated in FIG. 10, the slice manager 92 may switch the communication route between the plurality of routers 104 that form the lower ring 100a from the clockwise communication route being the active communication route to the counterclockwise communication route being the standby communication route. In such a case, after the switching, the data is transmitted counterclockwise in the communication between the routers 104 that form the lower ring 100a.

In addition, in the present embodiment, the communication route switching process with attention being given to downlink communication may be executed.

For example, it is assumed that, as described above, the clockwise communication route is the active communication route and the counterclockwise communication route is the standby communication route.

In such a case, for example, data to be transmitted from the CU 44 implemented in the regional data center 12a to the UE 20 within an area covered by the DU 42 under the control of the router 104a passes through the router 104e, the router 104a, and the DU 42 under the control of the router 104a.

In addition, data to be transmitted from the CU 44 implemented in the regional data center 12a to the UE 20 within an area covered by the DU 42 under the control of the router 104b passes through the router 104e, the router 104a, the router 104b, and the DU 42 under the control of the router 104b.

In addition, data to be transmitted from the CU 44 implemented in the regional data center 12a to the UE 20 within an area covered by the DU 42 under the control of the router 104c passes through the router 104e, the router 104a, the router 104b, the router 104c, and the DU 42 under the control of the router 104c.

In addition, data to be transmitted from the CU 44 implemented in the regional data center 12a to the UE 20 within an area covered by the DU 42 under the control of the router 104d passes through the router 104e, the router 104a, the router 104b, the router 104c, the router 104d, and the DU 42 under the control of the router 104d.

In such a case, the router 104e is the most upstream router 104 in the communication route that connects the plurality of routers 104 forming the lower ring 100a and that is for downlink communication from the CO 44 to the UE 20.

With attention being given thereto, the communication route switching condition may be a condition consisting of: (1) it is determined, in the communication quality deterioration determination process relating to the predetermined number of two or more routers 104 in succession from the router 104e in the downlink communication, that the communication quality of the communication networks under the control of the routers 104 has deteriorated; and (2) it is determined, in the communication quality deterioration determination process relating to the remaining routers 104, that the communication quality of the communication network under the control of the router 104 has not deteriorated.

In such a case, it may be determined, in the communication quality deterioration determination process, whether or not the communication quality in the downlink communication has deteriorated. When the communication route switching condition relating to whether or not the communication quality in the downlink communication has deteriorated is satisfied, the communication route switching process may be executed.

For ring networks other than the lower ring 100a, it is also possible to execute the communication route switching process by the same method as that for the lower ring 100a. For example, it is also possible to execute the communication route switching process for the lower ring 100b and the lower ring 100c by the same method as that for the lower ring 100a.

For the intermediate ring 102, it is also possible to execute the communication route switching process by the same method as that for the lower ring 100a. In such a case, for example, the communication quality deterioration determination process and the communication route switching process may be executed for each of the plurality of routers 104 that form the intermediate ring 102 based on the communication quality of the communication network under the control of the router 104.

As another example, it is assumed that the clockwise communication route for the communication between the plurality of routers 104 that form the lower ring 100a is duplexed and provided as a clockwise active communication route and a clockwise standby communication route. In the situation, when the communication route switching condition is satisfied, the slice manager 92 may switch the communication route between the plurality of routers 104 from the active communication route, which is one of the duplex communication routes, to the standby communication route, which is the other communication route.

There may occur deterioration of the communication performance (so-called silent failure) in the communication between elements such as functional units through a ring network without an abnormality such as a failure being detected in monitoring of the communication between the routers 104 that form the ring network.

Here, for example, when a failure has occurred in the communication route between the router 104c and the router 104d, it is highly probable that the communication quality of the communication networks under the control of the router 104a, the router 104b, and the router 104c deteriorates in the uplink communication. In such a case, it is considered to be unlikely that the communication quality of the communication networks under the control of the router 104b and the router 104c has deteriorated and the communication quality of the communication network under the control of the router 104a has not deteriorated.

Thus, when the communication quality of the communication networks under the control of a predetermined number of two or more routers 104 in succession from the most upstream router 104 in the communication route connecting the plurality of routers 104 has deteriorated and the communication quality of the communication networks under the control of the remaining routers 104 has not deteriorated, it is suspected that a failure has possibly occurred in the ring network itself.

Meanwhile, when the communication quality of the communication network under the control of the most upstream router 104 in the communication route connecting the plurality of routers 104 has not deteriorated, it is unlikely that a failure has occurred in the ring network itself. For example, when the communication quality of the communication networks under the control of the router 104b and the router 104c has deteriorated and the communication quality of the communication network under the control of the router 104a has not deteriorated, it is suspected that a failure (for example, node failure) has possibly occurred in each of the elements under the control of the router 104b and the router 104c.

Further, when the communication quality of the communication network under the control of a single router 104 has deteriorated, it is suspected that a failure (for example, node failure) has possibly occurred in the element under the control of the router 104. Further, when, for all the routers 104 that form the ring network, the communication quality of the communication networks under the control of the routers 104 has deteriorated, it is suspected that a failure (for example, node failure) has possibly occurred in the element under the control of the router 104 that forms an upper-level ring network above the ring network. In those cases as well, it is unlikely that a failure has occurred in the ring network itself.

With attention being given to the matters described above, in the present embodiment, when it is determined that the communication quality of the communication networks under the control of a predetermined number of two or more routers 104 in succession from the most upstream router 104 in the communication route connecting the plurality of routers 104 has deteriorated and it is determined that the communication quality of the communication network under the control of the remaining router 104 has not deteriorated, the communication route between the plurality of routers 104 is switched to the alternative route. With such a configuration, when a failure has occurred in the ring network, the failure is solved.

As described above, according to the present embodiment, countermeasures can be accurately taken against occurrence of a silent failure in communication between elements through a ring network.

Figure 11:
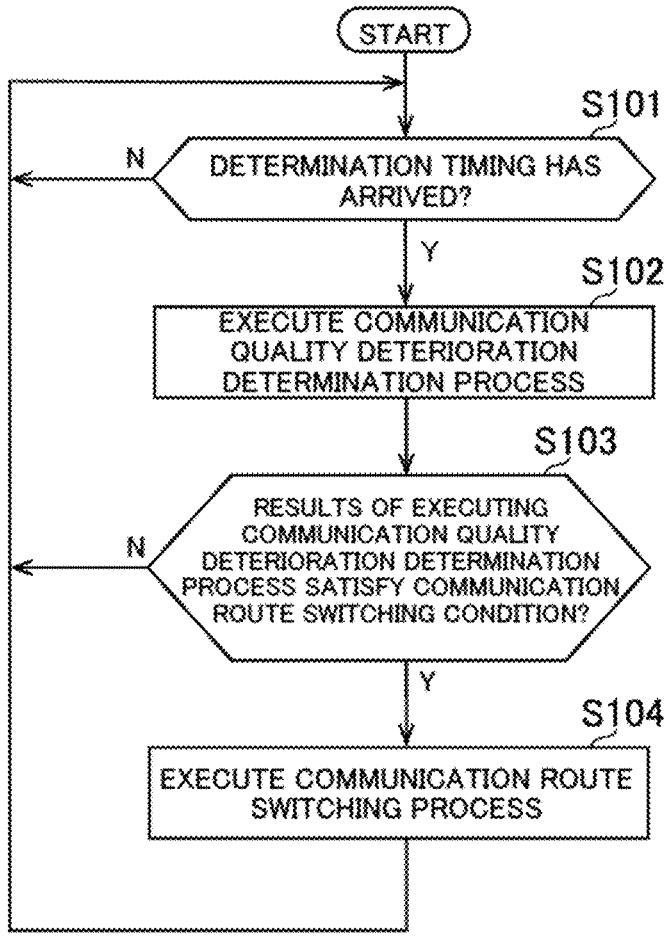
FIG. 11 is a flow chart for illustrating an example of a flow of a process performed by the platform system in the one embodiment of the present invention.

Now, an example of a flow of a process relating to switching control of the communication route, which is performed by the platform system 30 in the present embodiment, is described with reference to a flow chart exemplified in FIG. 11.

In the present process example, it is assumed that a determination timing as to whether or not to switch the communication route arrives at predetermined time intervals (for example, intervals of 15 minutes).

The policy manager 90 stands by for arrival of the determination timing (Step S101).

When the determination timing has arrived, the policy manager 90 executes the communication quality deterioration determination process for each of the plurality of routers 104 that form the lower ring 100a (Step S102). The communication quality deterioration determination process illustrated in Step S102 refers to a process of determining, in the above-mentioned manner, whether or not the communication quality of the communication network under the control of the router 104 has deteriorated. Here, for example, the policy manager 90 may acquire the performance index value data indicating the communication performance of the elements included in the communication network under the control of the router 104 to determine, based on the acquired performance index value data, whether or not the communication quality of the communication network under the control of the router 104 has deteriorated.

Then, the policy manager 90 determines whether or not results of executing the communication quality deterioration determination process for the respective plurality of routers 104 as illustrated in Step S102 satisfy the communication route switching condition (Step S103). In the process step of Step S103, it is determined whether or not the results satisfy, for example, the communication route switching condition consisting of: (1) it is determined, in the communication quality to the deterioration determination process relating predetermined number of two or more routers 104 in succession from the most upstream router 104, that the communication quality of the communication networks under the control of the routers 104 has deteriorated; and (2) it is determined, in the communication quality deterioration determination process relating to the remaining routers 104, that the communication quality of the communication networks under the control of the routers 104 has not deteriorated.

When it is not determined in the process step of Step S103 that the communication route switching condition is satisfied (N in Step S103), the process returns to the process step of Step S101.

When it is determined in the process step of Step S103 that the communication route switching condition is satisfied (Y in Step S103), the slice manager 92 executes the communication route switching process (Step S104), and the process returns to the process step of Step S101. In the communication route switching process illustrated in Step S104, for example, the communication route between the plurality of routers 104 that form the lower ring 100a is switched to the alternative route.

It should be noted that the present invention is not limited to the above-mentioned embodiment.

For example, the functional unit in the present embodiment is not limited to those illustrated in FIG. 3.

Further, the functional unit in the present embodiment is not required to be an NF in 5G. For example, the functional unit in the present embodiment may be an eNodeB, a vDU, a vCU, a packet data network gateway (P-GW), a serving gateway (S-GW), a mobility management entity (MME), a home subscriber server (HSS), or another network node in 4G.

Further, the communication quality may be monitored by any function illustrated in FIG. 5 other than the monitor 72. For example, the communication quality may be monitored by the policy manager 90. Further, the communication quality deterioration determination process may be executed by any function illustrated in FIG. 5 other than the policy manager 90. Further, the communication route switching process may be executed by any function illustrated in FIG. 5 other than the slice manager 92.

Further, the functional unit in the present embodiment may be implemented through use of a hypervisor-type or host-type virtualization technology instead of the container-type virtualization technology. Further, the functional unit in the present embodiment is not required to be implemented by software, and may be implemented by hardware, for example, by an electronic circuit. Further, the functional unit in the present embodiment may be implemented by a combination of an electronic circuit and software.

The technology described in the present disclosure can also be expressed as follows.

[1]
A communication route control system including:
monitoring means that monitors, for each of a plurality of routers that form a ring network, communication quality of a communication network under control of the each of the plurality of routers;
determination means that determines, for each of the plurality of routers, whether the communication quality of the communication network under the control of the each of the plurality of routers has deteriorated; and switching means that switches, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

[2]
The communication route control system according to Item [1], wherein the monitoring means monitors, as the communication quality of the communication network under the control of the each of the plurality of routers, communication quality of communication between at least one element included in the communication network under the control of the each of the plurality of routers and at least one element under the control of a router that forms an upper-level ring network above the ring network.

[3]
The communication route control system according to Item [2], wherein the monitoring means monitors, as the communication quality of the communication network under the control of the each of the plurality of routers, communication quality of communication between at least one element that forms the communication network under the control of the each of the plurality of routers and a central unit (CU) under the control of a router that forms an upper-level ring network above the ring network.

[4]
The communication route control system according to Item [1], wherein the monitoring means monitors, as the communication quality of the communication network under the control of the each of the plurality of routers, communication quality of a user equipment (UE) within an area covered by at least one element under the control of the each of the plurality of routers.

[5]
The communication route control system according to any one of Items [1] to [4], further including performance index value calculation means that calculates a performance index value indicating communication performance of each element included in the communication network under the control of the each of the plurality of routers based on at least one of a type of at least one element included in the communication network under the control of the each of the plurality of routers or a topology of the at least one element,
wherein the monitoring means monitors the performance index value, and
wherein the determination means determines, based on the performance index value, whether the communication quality of the communication network under the control of the each of the plurality of routers has deteriorated.

[6]
The communication route control system according to any one of Items [2] to [5], wherein the at least one element is a network function.

[7]
The communication route control system according to any one of Items [1] to [6], wherein the switching means switches the communication route between the plurality of routers that form the ring network, which is the communication route in any one of a clockwise direction or a counterclockwise direction, to a communication route in a reverse direction.

[8]

A communication route control method including:

monitoring, for each of a plurality of routers that form a ring network, communication quality of a communication network under control of the each of the plurality of routers;

determining, for each of the plurality of routers, whether the communication quality of the communication network under the control of the each of the plurality of routers has deteriorated; and switching, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

The invention claimed is:

1. A communication route control system, comprising one or more processors, the communication route control system causing at least one of the one or more processors to execute:

a monitoring process of monitoring, for each of a plurality of routers that form a ring network, communication quality of a communication network under control of the each of the plurality of routers;

a determination process of determining, for each of the plurality of routers, whether the communication quality of the communication network under the control of the each of the plurality of routers has deteriorated; and a switching process of switching, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

2. The communication route control system according to claim 1, wherein, in the monitoring process, as the communication quality of the communication network under the control of the each of the plurality of routers, communication quality of communication between at least one element included in the communication network under the control of the each of the plurality of routers and at least one element under the control of a router that forms an upper-level ring network above the ring network is monitored.

3. The communication route control system according to claim 2, wherein, in the monitoring process, as the communication quality of the communication network under the control of the each of the plurality of routers, communication quality of communication between at least one element that forms the communication network under the control of the each of the plurality of routers and a central unit (CU) under the control of a router that forms an upper-level ring network above the ring network is monitored.

4. The communication route control system according to claim 1, wherein, in the monitoring process, as the communication quality of the communication network under the control of the each of the plurality of routers, communication quality of a user equipment (UE) within an area covered by at least one element under the control of the each of the plurality of routers is monitored.

5. The communication route control system according to claim 1, wherein the communication route control system further causes the at least one of the one or more processors to execute a performance index value calculation process of calculating a performance index value indicating communication performance of each element included in the communication network under the control of the each of the plurality of routers based on at least one of a type of at least one element included in the communication network under the control of the each of the plurality of routers or a topology of the at least one element, wherein, in the monitoring process, the performance index value is monitored, and wherein, in the determination process, whether the communication quality of the communication network under the control of the each of the plurality of routers has deteriorated is determined based on the performance index value.

6. The communication route control system according to claim 2, wherein the at least one element is a network function.

7. The communication route control system according to claim 1, wherein, in the switching process, the communication route between the plurality of routers that form the ring network, which is the communication route in any one of a clockwise direction or a counterclockwise direction, is switched to a communication route in a reverse direction.

8. A communication route control method, comprising:

monitoring, for each of a plurality of routers that form a ring network, communication quality of a communication network under control of the each of the plurality of routers;

determining, for each of the plurality of routers, whether the communication quality of the communication network under the control of the each of the plurality of routers has deteriorated; and switching, when it is determined that the communication quality of the communication networks under the control of a predetermined number of two or more routers in succession from the router on a most upstream side in a communication route connecting the plurality of routers has deteriorated and it is determined that the communication quality of the communication network under the control of remaining router has not deteriorated, the communication route between the plurality of routers to an alternative route.

* * * * *